A. D. ALLEN.
ROTARY CUTTER FOR WOODWORKING MACHINES.
APPLICATION FILED MAY 15, 1917.
1,355,024.  Patented Oct. 5, 1920.
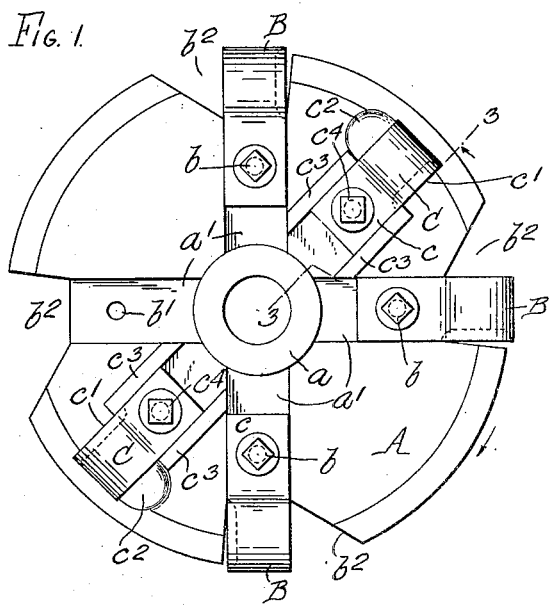
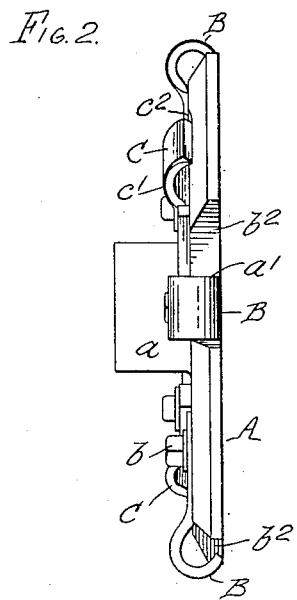
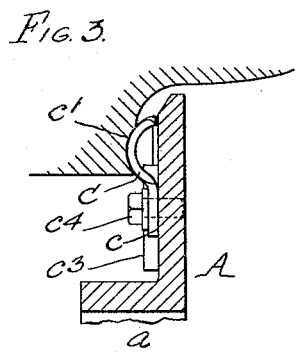
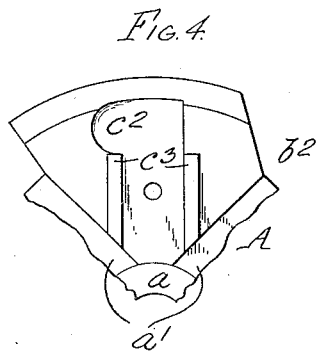

UNITED STATES PATENT OFFICE.

ARTHUR D. ALLEN, OF MOUNT MORRIS, NEW YORK.

ROTARY CUTTER FOR WOODWORKING-MACHINES.

1,355,024.  Specification of Letters Patent.  Patented Oct. 5, 1920.

Application filed May 15, 1917. Serial No. 168,704.

*To all whom it may concern:*

Be it known that I, ARTHUR D. ALLEN, a citizen of the United States, residing at Mount Morris, in the county of Livingston and State of New York, have invented a new and useful Improvement in Rotary Cutters for Woodworking-Machines, of which the following is a specification.

This invention relates to rotary cutters of the kind adapted to be used on wood working machines.

The objects of the invention are to produce a cutter of this kind of simplified and improved construction which is provided with two sets of cutting knives, one set being used for cutting away a certain amount of the rough stock and the other set being used for finishing the work; also to improve the construction of cutters of this kind in other respects hereinafter specified.

In the accompanying drawings:

Figure 1 is a front elevation of a cutter embodying the invention.

Fig. 2 is a side elevation thereof.

Fig. 3 is a fragmentary sectional elevation thereof on line 3—3, Fig. 1, showing one of the roughing or advance knives in operative relation to the work.

Fig. 4 is a fragmentary front elevation of the cutter head showing one of the cutters removed therefrom.

The cutter shown in the drawings is primarily intended for use on lathes for turning irregular shapes, but the cutter may, if desired, be used on other wood working or analogous machinery.

A represents a rotary cutter head or plate on which the cutting blades or knives are mounted and which, in the construction shown, is provided with a central hub portion $a$ adapted to be secured on the rotary cutter shaft (not shown) of a machine. The cutter head is provided with radial grooves or seats $a'$ in which the usual cutting blades or knives B are secured by any suitable means, such for example as screws or bolts $b$ engaging in holes $b'$ in the cutter head. The cutter head is provided with recesses or notched portions $b^2$ in its periphery at the outer ends of the channels $a'$, which facilitates the clearing of the chips of shavings. All of these parts have heretofore been used on cutters of this kind and of themselves constitute no part of this invention.

When a cutter of this kind is used on work requiring deep cuts, it has heretofore been found necessary to first cut away some of the stock before the cutter can be successfully used. In order to eliminate the necessity of thus performing two operations upon the work, the cutter head is provided with roughing knives arranged to act on the work in advance of the finishing knives B. In the construction shown for this purpose, roughing or advance knives C are provided, which have shank portions $c$ suitably secured on the cutter head in the spaces between the finishing knives B, and cutting portions $c'$ which are preferably curved and extend outwardly from the front face of the cutter head. The cutting portions of the advance knives C and of the finishing knives B are so arranged that the finishing knives extend outwardly from the axis of rotation to a greater extent than the advance knives, and the advance knives preferably extend forwardly from the front face of the cutter head to a greater extent than the finishing knives, so that when the cutter is in use, the roughing or advance knives make a cut in the work in advance of the finishing knives, but enter the work only in case deep cuts are made, as shown in Fig. 3. When the cutter enters a portion of the work requiring a shallow cut, the roughing knives do not enter the work and do not in any way interfere with the work of the finishing knives B. The cutter head is preferably provided with elongated depressed portions or channels $c^2$ arranged in rear of the cutting portions $c'$ of the knives C, through which the chips or shavings can pass, the outer ends of the knives resting upon the face of the cutter. The cutter head is preferably provided with ribs or projections $c^3$ forming guides between which the shank portions $c$ of the advance knives can be held by any suitable means, such, for example, as bolts or screws $c^4$, the lateral space between the ribs being less than the length of the depressions in the face of the disk. These ribs or projections $c^3$ further serve to reinforce the cutter disk and to permit of the use of a relatively light weight disk without danger of buckling or distorting the same, and the ribs or projections by reason of their angular position relative to the grooved portions $a'$ effectively serve to strengthen the disk and make it more rigid, preventing distortion under the influence of the forces acting on the cutters B as they enter the work.

By means of the structure shown, two distinct cuts are made in those portions of the work where a deep cut is required, thus performing at one time the two operations of first roughing out the work and then finishing the same. The roughing knives do not interfere with the use of the cutter head when required for shallow cuts and, if desired, can be easily removed from the cutter head. The roughing cutters are independent of the finishing cutters and do not in any way interfere with the operation of the latter.

I claim as my invention:

1. A cutter for wood working machines comprising a cutter head having a substantially flat plate or disk portion, a plurality of finishing knives rigidly secured in grooves formed on the front face of said plate or disk portion, notches in the peripheral portion of said head into which said finishing knives extend, roughing knives arranged on the front face of said head between said finishing knives and having their cutting portions arranged nearer to the axis of said cutter head than the cutting portions of said finishing knives, projections formed on the front face of said disk portion and between which said roughing knives are rigidly secured, and depressions in the front face of said cutter head beyond said projections through which the cuttings of said roughing knives are adapted to pass.

2. A cutter for wood working machines comprising a cutter head having a disk portion, said disk portion having a plurality of peripheral notches therein and a plurality of grooves extending radially from its axis of rotation to the notches, a finishing knife rigidly secured in each of said grooves, said finishing knives extending into the peripheral notches of the disk, and the outer ends of the finishing knives extending beyond the periphery of the disk, a plurality of radial rib members on the face of said disk, said rib members being arranged in pairs between said finishing knife grooves and extending angularly therefrom, said rib members terminating short of the periphery of said disk, elongated depressions in the face of the disk, one at the outer end of each pair of rib members, said depressions extending transversely of the pairs of rib members and being of greater length than the lateral space between said rib members, a roughing knife between each pair of finishing knives, each of said roughing knives having a shank secured between a pair of said rib members, and a cutting portion projecting outwardly from the face of the disk and extending over the depression in the disk, the outer end edge of said roughing knife resting upon the face of the disk beyond said depression.

Witness my hand, this 7th day of May, 1917.

ARTHUR D. ALLEN.

Witnesses:
 MARION S. WALL,
 CHAS. H. BENNETT.